United States Patent

Bohner et al.

[11] Patent Number: 5,862,878
[45] Date of Patent: Jan. 26, 1999

[54] HYDRAULIC POWER STEERING SYSTEM

[75] Inventors: Hubert Bohner, Boeblingen; Martin Moser, Fellbach, both of Germany

[73] Assignee: Mercedes-Benz AG, Stuttgart, Germany

[21] Appl. No.: 766,035

[22] Filed: Dec. 16, 1996

[30] Foreign Application Priority Data

Dec. 14, 1995 [DE] Germany .................. 195 46 733.7

[51] Int. Cl.⁶ .................................................. B62D 5/08
[52] U.S. Cl. ............................................ 180/403; 180/406
[58] Field of Search .................................. 180/402, 403, 180/404, 405, 406

[56] References Cited

U.S. PATENT DOCUMENTS

| | | |
|---|---|---|
| 3,832,849 | 9/1974 | Lang . |
| 4,651,841 | 3/1987 | Adams ..................................... 180/406 |
| 4,736,811 | 4/1988 | Marsden et al. . |
| 4,955,445 | 9/1990 | Kauss . |
| 5,489,005 | 2/1996 | Marcott et al. ......................... 180/406 |

FOREIGN PATENT DOCUMENTS

| | | |
|---|---|---|
| 21 23 933 | 11/1972 | Germany . |
| 22 33 167 | 1/1974 | Germany . |
| 37 29 898 | 3/1989 | Germany . |
| 38 37 395 | 5/1989 | Germany . |
| 41 33 726 | 4/1992 | Germany . |
| WO 88/09281 | 12/1988 | WIPO . |
| WO 92/06880 | 4/1992 | WIPO . |

OTHER PUBLICATIONS

Japanese Abstract No. 62–15167, M–599, Jun. 17, 1987, vol. 11/No. 188.

*Primary Examiner*—Kevin Hurley
*Attorney, Agent, or Firm*—Evenson, McKeown, Edwards & Lenahan, P.L.L.C.

[57] ABSTRACT

A hydraulic power steering system is provided in which a manual steering device and the steering vehicle wheels are normally coupled only by way of a control path with a desired-value generator operated by the manual steering device and an actual-value generator operated by the steering vehicle wheels. For controlling a hydraulic servomotor used for the steering operation of the steering vehicle wheels, a servo valve arrangement is operated by a desired-value/actual-value comparison. Only when there is a disturbance in the control path, will a hydraulic forced coupling take place between the manual steering device and the steering vehicle wheels.

22 Claims, 2 Drawing Sheets

HYDRAULIC POWER STEERING SYSTEM

BACKGROUND AND SUMMARY OF THE INVENTION

This invention relates to a hydraulic power steering system having a double-acting servo motor which, with respect to the drive, is connected to mechanical steering elements of steering vehicle wheels; a controllable servo valve arrangement for the controllable connection of the servo motor with a hydraulic pressure source or a relatively pressureless reservoir; an electric or electronic desired-value generator which is operated by a manual steering device, particularly a manual steering wheel, and which is connected with an input of an electronic control path which, on the output side, is connected with the servo valve arrangement and which, by way of another input, is connected with an actual-value generator reflecting the steering position of the steering vehicle wheels and can be constantly tested automatically with respect to a faultless function; and a hydrostatic driving connection arranged between the manual steering device and the steering elements which is normally inoperative and which automatically becomes operative in the case of faults of the control path.

A power steering system of this type, without any mechanical forced coupling between the manual steering device and the steering vehicle wheels, is the object of German Patent document DE 38 37 395 A1 (corresponding to U.S. Pat. No. 4,955,445). In the case of this known system, the manual steering wheel actuates during the normal operation only an electric desired-value generator which is part of a control system for controlling the servo valve. This servo valve is constructed such that, in its center position, it hydraulically blocks the servo motor; that is, the motor connections are blocked. In addition, the manual steering wheel can be connected with the servo motor by way of a pump which is mechanically connected with the servomotor. The pump connections are hydraulically arranged between the connections of the servo motor and the assigned connections of the servo valve. As soon as the failing function of the control system controlling the servo valve is determined, the servo valve is moved into its center position and the pump is hydraulically coupled with the servo motor with respect to the drive. It is true that in the case of this power steering system, faults in the electronic control system of the servo valve can basically be controlled because then the hydraulic forced coupling between the servo motor and the pump driven by the manual steering wheel becomes operative. However, there is no safety should the servo valve block in a position deviating from the center position. In such a case, a hydraulic forced coupling between the servo motor and the pump would not be possible.

In the case of a steering system without a mechanical forced coupling between the steering vehicle wheels and the manual steering device known from International Patent document WO 88/09281 (corresponding to U.S. Pat. No. 4,736,811), a servo valve, which is used for controlling a servo motor provided for the steering operation of the steering vehicle wheels, can, on the one hand, be controlled electrically and, on the other hand, can be controlled hydraulically. In the normal operation, an electric desired-value generator is actuated by the manual steering wheel and is assigned to a control path for controlling the servo valve. Should a fault occur in this control path, a hydraulic circuit switches into operation which now permits a hydraulic control of the servo valve by way of the manual steering wheel.

From German Patent document DE-OS 22 33 167 (corresponding to U.S. Pat. No. 3,832,849), a hydrostatic steering system is known in the case of which the manual steering wheel and the steering vehicle wheels are hydraulically connected with one another with respect to the drive for their steering operation. As a function of the hydraulic pressures in the above-mentioned driving connection, a servo valve is controlled. The servo valve connects a servo motor connected with steering gears of the steering vehicle wheels. The servo valve is controlled in such a manner with a pressure source or a relatively pressureless reservoir that a servo power is generated which assists the respective steering maneuver and therefore reduces the manual force-required at the manual steering wheel.

German Patent document DE 41 33726 A1 shows a hydrostatic steering system with two parallel hydraulic circuits, each of which are separately sufficient for implementing steering maneuvers. One hydraulic circuit has a valve arrangement for controlling a first hydraulic servo motor of the steering system, which valve arrangement is mechanically operated by the manual steering wheel. The second hydraulic circuit has an electrically operated valve arrangement for controlling a second hydraulic servo motor for the steering vehicle wheels. In this case, the electric control elements of the valve arrangement are controlled as a function of a desired-value generator actuated by the manual steering wheel. This results in a so-called asymmetrical redundancy.

From German Patent document DE-AS 21 23 933, a hydrostatic steering system with a hydraulic servo assistance is known which is constructed such that a reaction power can be sensed at the manual steering wheel which is a function of the pressure conditions on the hydraulic servo motor for the steering vehicle wheels.

In German Patent document DE 37 29 898 C2, a hydraulic actuating drive for an automatic auxiliary rear wheel steering system of a motor vehicle is described. The hydraulic system is designed in such fashion that the auxiliary steering system is automatically blocked when the energy supplied to actuating assemblies of hydraulic control elements is switched off.

Japanese Patent document JP 62-15167 A shows a system which is similar to that of the initially discussed German Patent document DE 38 37 395 A1. During the normal operation, a manual steering wheel actuates an electric desired-value generator which is part of a control path for controlling a valve arrangement which, in turn, controls a hydraulic actuating drive of the steering vehicle wheels. In the case of a faulty operation of the control path, the mentioned actuating drive is hydraulically coupled with a hydraulic generator assembly which, with respect to the drive, is mechanically connected with the manual steering wheel.

Currently, as a rule, hydraulic power steering systems are installed in motor vehicles in the case of which a manual steering wheel is constantly connected mechanically with respect to the drive with the steering vehicle wheels for the steering operation. In this case, the servo valve is typically controlled by parts of the mechanical driving connection, particularly a steering column, between the manual steering wheel and the steering elements. For this purpose, parts of this driving connection can be adjusted relative to one another as a function of the transmitted forces or moments. The respective adjusting movement is transmitted to control parts of the servo valves.

In the case of such power steering systems, a so-called reaction control is also known which has the purpose of changing the manual forces to be applied at the manual steering wheel for its adjustment as a function of servo forces by means of which the servo motor assists the respective steering maneuver.

Such reaction control systems may operate hydraulically, in which case control parts of the servo valve are provided with separate effective areas which can be acted upon by hydraulic pressure which can be changed analogously to the pressure conditions at the servo motor in order to oppose an adjustment of the control parts by means of a more or less large resistance. In this case, the mentioned effective surfaces, in a regular manner, form parts of displacement chambers whose volume changes when the control parts are adjusted.

There is therefore needed a new power steering system, while using as many tested, reliable system parts as possible, which ensures a particularly high safety despite the elimination of a mechanical through-drive between the manual steering device and the steering vehicle wheels.

In the case of a hydraulic steering system of the above-mentioned type, these needs are achieved in that the hydrostatic driving connection is arranged independently of, or in parallel to, the hydraulic system of the system controlled by the servo valve and, in the case of the faulty operation of the control path, the servo motor can be switched into a free-running condition by the servo valve and/or by a shut-off valve which is closed only in the case of a faultless operation of the control path.

The invention is based on the general idea of arranging the hydrostatic driving connection separately from the hydraulic system of the servo system, and for providing multiple possibilities for switching the servo motor into a free-running condition. As a result, the highest safety can be provided in the case of faulty operations of the control path as well as in the case of defects of the hydraulic system of the servo system.

During the normal operation, the control path operates such that the manual steering wheel and the steering vehicle wheels are operatively connected electronically by means of wire; that is, the system according to the invention can be characterized as "steer by wire". In an emergency, a hydraulic forced coupling becomes operative between the manual steering device and the vehicle wheels.

According to a preferred embodiment of the invention, the hydrostatic driving connection communicates by way of control lines with hydraulic control input of the servo valve so that, when the hydrostatic driving connection is switched operative, the servo valve is actuated hydraulically and the servo motor is correspondingly controlled for assisting the steering maneuver.

This can be implemented in a simple manner in that the initially mentioned servo valves with a reaction control are used and the effective surfaces of the reaction control are acted upon by pressures in the hydrostatic driving connection.

Other objects, advantages and novel features of the present invention will become apparent from the following detailed description of the invention when considered in conjunction with the accompanying drawings.

BRIEF DESCRIPTION OF THE DRAWINGS

FIG. 2 is a corresponding representation of a system with a servo assistance while the hydrostatic driving connection is switched on.

DETAILED DESCRIPTION OF THE DRAWINGS

Figure 1:
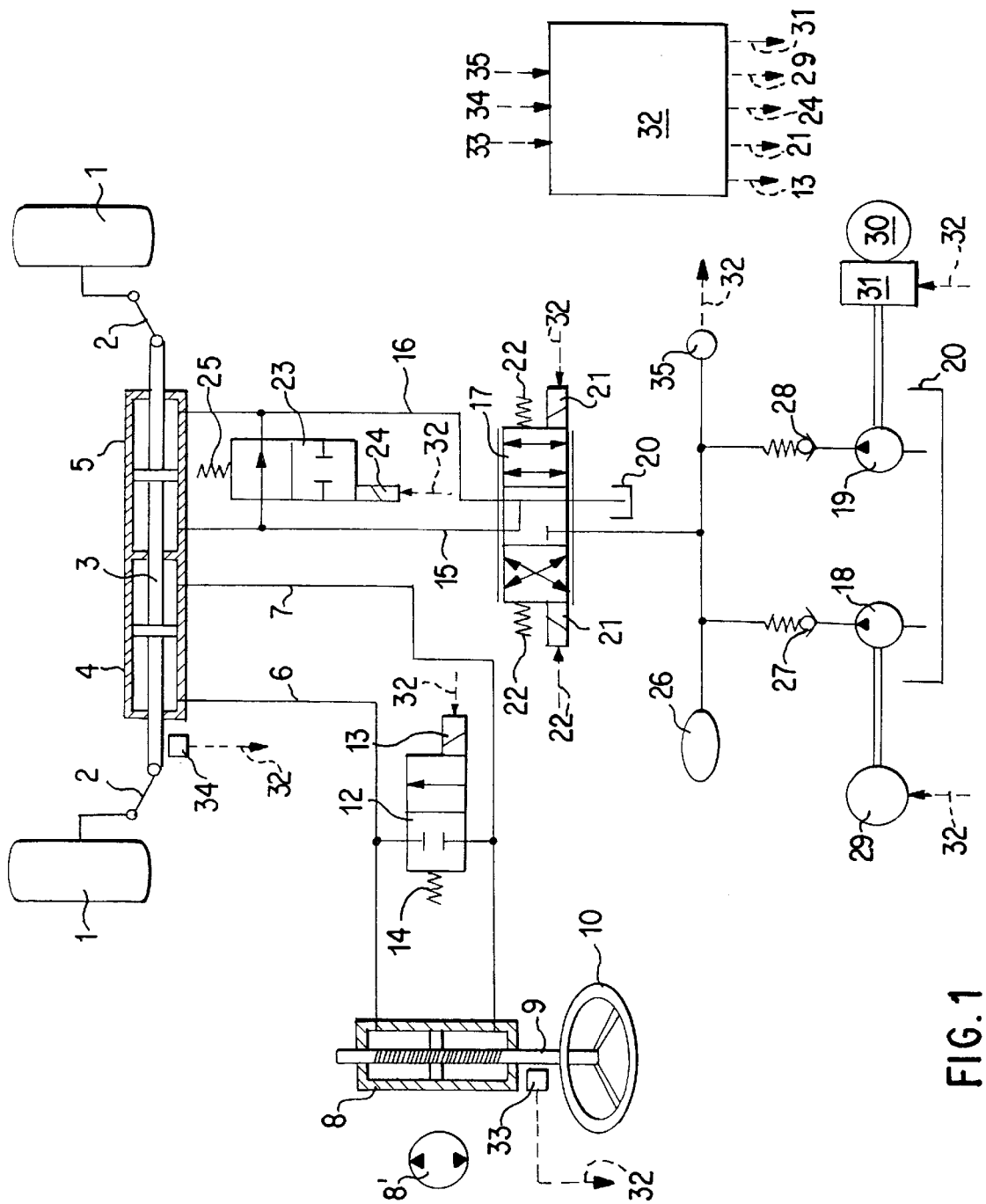
FIG. 1 is a schematic wiring diagram of a first embodiment according to the invention in which, after the switching-on of the hydrostatic driving connection, the operation takes place without any servo assistance.

According to FIG. 1, a motor vehicle, which is not shown in detail, has an axle, for example, a front axle, with steerable wheels 1 which, for controlling their steering, are connected by means of tie rods 2 with a common piston rod 3 of two double-acting piston-cylinder units 4 and 5 which are arranged equiaxially with respect to one another. In the case of a longitudinal displacement of the piston rod 3 in one direction or the other, the wheels 1 are therefore steered to the right or the left.

By way of lines 6 and 7, the two sides of the piston-cylinder unit 4 are connected with the two sides of a piston-cylinder unit 8 whose piston is connected with respect to the drive in a non-selflocking manner with the shaft 9 of a manual steering wheel 10. This is done so that this piston is displaced when the manual steering wheel 10 is rotated or so the manual steering wheel 10 rotates when the piston is displaced. Between the lines 6 and 7, a shut-off valve 12 is arranged which, when a solenoid 13 is energized, is opened against the force of a closing spring 14 and, when the current supply to the solenoid 13 is switched off, is moved into the illustrated closing position by the closing spring 14.

By way of lines 15 and 16, the two sides of the piston-cylinder unit 5 are connected with a control valve arrangement 17 which, in addition, is connected to the delivery side of pumps 18 and 19 as well as to a relatively pressureless hydraulic reservoir 20 to which the suction sides of the above-mentioned pumps 18 and 19 are connected.

In the illustrated center position, the control valve arrangement 17 connects the two sides of the piston-cylinder unit 5 with one another and, optionally, also with the reservoir 20. At the same time, the delivery side of the pumps 18 and 19 is blocked off with respect to the piston-cylinder unit 5. In the two other positions of the control valve arrangement 17, one side of the piston-cylinder unit 5 respectively is connected with the delivery side of the pumps 18 and 19, and one side is connected with the reservoir 20. These two latter positions are reached when one of the two solenoids 21 used for operating the control valve arrangement 17 is energized. When the two solenoids 21 are separated from the electric current supply, the control valve arrangement 17 is moved into the illustrated center position and is held in that position by means of its restoring springs 22.

Between the lines 15 and 16, a shut-off valve 23 is arranged which can be switched by means of a solenoid 24 against the force of an opening spring 25 from the illustrated opening position into the closing position.

Between the control valve arrangement 17 and the delivery sides of the two pumps 18 and 19, a hydraulic pressure accumulator 26 is arranged, in which case it is ensured by means of flap valves 27 and 28 that also, if the pump 18 or 19 should be inoperative, no pressure medium can flow back from the pressure accumulator 26 by way of one of the pumps 18 and 19 to the reservoir 20.

The pump 18 is driven by an electric motor 29 while the drive of the pump 19 takes place by way of the engine 30 used for driving the motor vehicle which is connected with the pump 19 with respect to the drive by way of a magnetic clutch 31.

For controlling the solenoids 13, 21 and 24 of the valves 12, 17 and 23 as well as for controlling the electric motor 29 and the magnetic clutch 31, a computer 32 is used which, on the input side, is connected with the signal outputs of an electronic desired-value generator 33 for the desired steering angle which is actuated by the manual steering wheel 10, as well as of an actual-value generator 34 for the actual value of the steering angle and of a pressure sensor 35 assigned to the pressure accumulator 26. In addition, the computer 32 can also be connected on the input side with signal generators which are not shown and which reflect the position of the control valve arrangement 17.

In a normal, no-disturbance operation, the computer 32 holds the shut-off valve 12 in the open position by energizing its solenoid 13 and holds the shut-off valve 23 in the closed position by energizing its solenoid 24. As a result, on the one hand, the piston-cylinder unit 4 is hydraulically uncoupled from the piston-cylinder unit 8. On the other hand, by the operation of the control valve arrangement 17, the piston-cylinder unit 5 can be operated in one direction or the other, provided that the pressure accumulator 26 is sufficiently charged. This charge condition is constantly tested by the computer 32 by means of the pressure sensor 35, in which case the pump 18 as well as the pump 19 can be used for recharging the accumulator 26. The former pump 18 is set into operation by the corresponding energizing of the electric motor 29, whereas, while the vehicle engine 30 is running, the pump 19 is switched on by the closing of the magnetic clutch 31.

The computer constantly tests itself with respect to a no-fault operation. Should a fault be determined, the solenoids 13, 21 and 24 of all valves 12, 17 and 23 are immediately separated from the electric power supply. This has the result that the piston-cylinder unit 4 and the piston-cylinder unit 8 are immediately coupled with one another hydraulically while the piston-cylinder unit 5 immediately changes into a free-running condition, specifically independently of whether the control valve arrangement 17 which, as a rule, is constructed in the manner of a slide valve, reaches the shown center position. The reason is that in each case the two sides of the piston-cylinder unit 5 are connected with one another by way of the now open shut-off valve 23.

Because of the now existing hydraulic coupling between the piston-cylinder units 4 and 8, the steering wheels 1 are operated by means of the hydraulic force transmission directly via the manual steering wheel 10.

Figure 2:
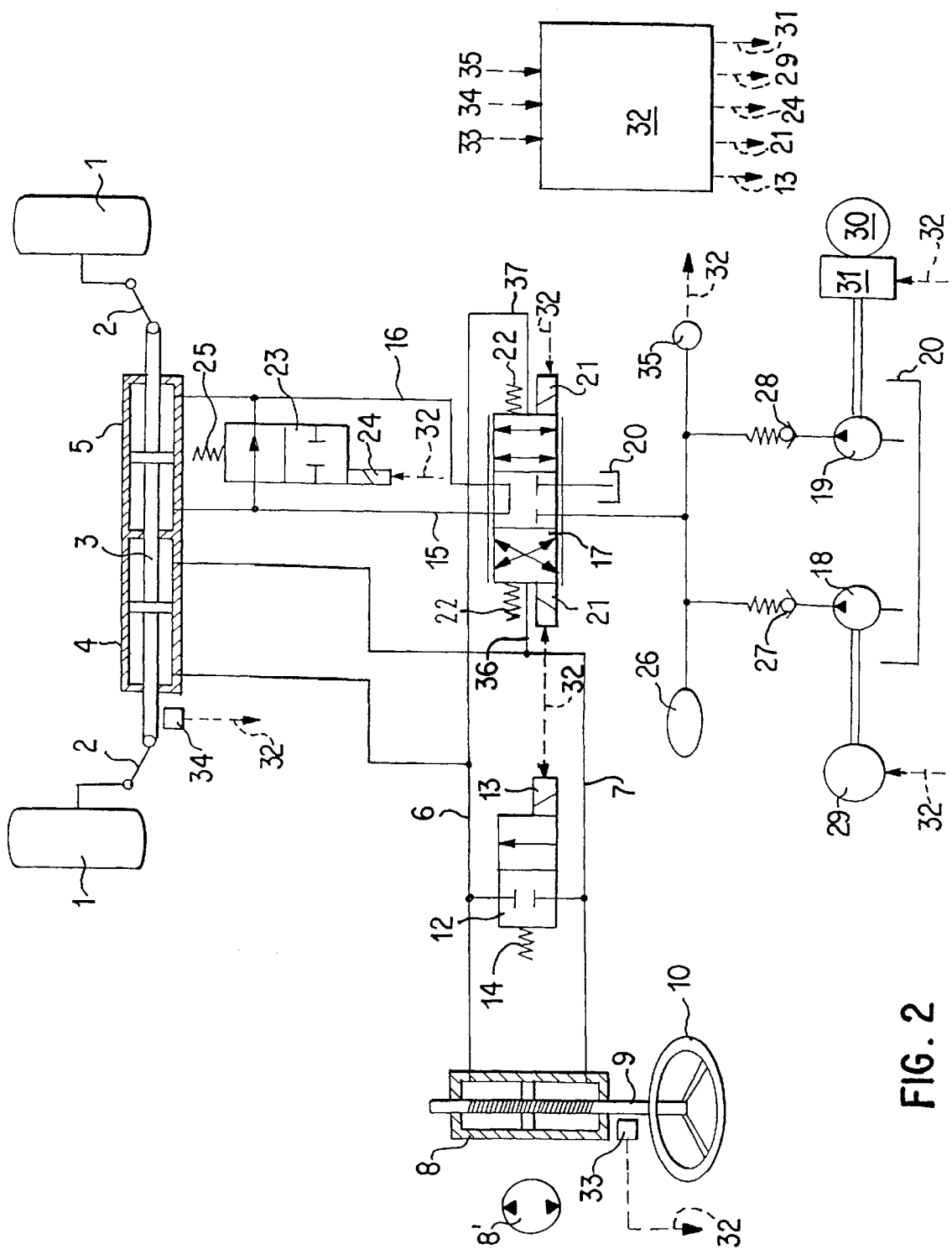

The embodiment according to FIG. 2 differs from the embodiment of FIG. 1 essentially because of the fact that the control valve arrangement 17 can be controlled not only electrically by means of the solenoids 21 but also hydraulically. For this purpose, hydraulic control inputs 36 and 37 are used which are connected with the lines 7 and 6, respectively.

The normal operation of the embodiment of FIG. 2 takes place in the same manner as the normal operation of the embodiment of FIG. 1. The computer 32 holds the shut-off valve 12 open and the shut-off valve 23 closed. Because of a desired-value/actual-value comparison between the signals of the desired-value generator 33 and the actual-value generator 34, the computer 32 operates the solenoids 21 of the control valve arrangement 17 such that the piston-cylinder unit 5 adjusts the desired steering angle.

Should a disturbance occur now which is not based on a blocking of the control valve arrangement 17; that is, the control valve arrangement 17 has remained adjustable, only the solenoids 13 and 21 are separated from their power supply, while the solenoid 24 continues to be energized and keeps the shut-off valve 23 closed. Now, on the one hand, the piston-cylinder units 4 and 8 are hydraulically coupled with one another so that a hydraulic forced connection exists between the manual steering wheel 10 and the steering adjustment of the wheels 1. On the other hand, the control valve arrangement 17 is now controlled hydraulically by way of its control inputs 36 and 37 corresponding to the direction and size of the hydraulic pressure difference between the lines 6 and 7; that is, as a function of the manual force to be applied at the manual steering wheel 10. As a result, while the pump 18 and/or 19 continues to operate, the piston-cylinder unit 5 can generate a servo force or additional force which reduces the manual force.

Should the control valve arrangement 17 jam, which can be reported by signal generators, which are not shown, on the control valve arrangement 17, the solenoid 24 of the shut-off valve 12 is also disconnected from the electric power supply so that the valve 23 opens and the piston-cylinder unit 4 is under all circumstances switched to free running. Thus, the hydraulic forced coupling between the manual steering wheel 10 and the steering vehicle wheels 1 is maintained. However, the work at the manual steering wheel 10 is no longer assisted by a servo force of the piston-cylinder unit 5.

Deviating from the illustrated embodiments, the piston-cylinder units 4, 5 and/or 8, particularly the piston-cylinder unit 8 operated by the manual steering wheel 10, can be replaced by a hydrostatic motor unit or pump unit 8'.

In the case of the hydrostatic pump unit 8' assigned to the manual steering wheel 10, this has the advantage that no end position can be predetermined by the manual-steering-wheel-side unit 8'.

If only relatively little space is available in the longitudinal direction of the piston rod 3, the piston-cylinder units 4 and 5 can also be arranged in parallel side-by-side, in which case a radial lengthening can then be arranged on the rod 3 and can be connected with the piston rod of the unit 5 which is in parallel to the rod 3.

Deviating from the representation in FIGS. 1 and 2, a pinion can also be arranged on the shaft 9 of the manual steering wheel 10, which pinion meshes with a toothed rack which, in turn, is connected with a piston rod of the piston-cylinder unit 8 or is constructed on this piston rod.

Instead of the piston-cylinder elements 4, 5 and/or 8, hydrostatic motors or conveying elements may also be arranged.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic power steering system, comprising:
   a servo system including a double-acting servo motor which, with respect to a drive, is coupled to mechanical steering elements of steering vehicle wheels and a controllable servo valve arrangement for a controllable connection of the servo motor with either a hydraulic pressure source or a relatively pressureless reservoir;
   a desired-value generator which is actuated by a manual steering device and which is connected with an input of an electronic control path which, on an output side, is connected with the servo valve arrangement and which, by way of another input, is connected with an actual-value generator reflecting a steering position of the steering vehicle wheels and which is constantly tested automatically with respect to a faultless function; and a hydrostatic driving connection arranged between the manual steering device and the mechanical steering elements which is normally inoperative and which automatically becomes operative when a fault occurs in the electronic control path;

a shut off valve arranged between the double-acting servo motor and the controllable servo valve arrangement of the servo system, the shut-off valve being closed only when in a fault-free operation of the electronic control path;

wherein the hydrostatic driving connection is arranged one of independently of and in parallel to a hydraulic system of the servo system controlled by the controllable servo valve arrangement and, in an event of a faulty operation of the electronic control path, the servo motor is switched into a free-running condition by at least the shut-off valve.

2. The hydraulic power steering system according to claim 1, wherein the servo valve arrangement has hydraulic control inputs which communicate with the hydrostatic driving connection, such that, when the hydrostatic driving connection is switched operative, the controllable servo valve arrangement is controlled by pressure differences which occur therein.

3. The hydraulic power steering system according to claim 1, wherein the pressure source comprises two pumps which are driven and switched on independently of one another.

4. The hydraulic power steering system according to claim 2, wherein the pressure source comprises two pumps which are driven and switched on independently of one another.

5. The hydraulic power steering system according to claim 1, wherein the pressure source comprises a hydraulic pressure accumulator.

6. The hydraulic power steering system according to claim 2, wherein the pressure source comprises a hydraulic pressure accumulator.

7. The hydraulic power steering system according to claim 3, wherein the pressure source comprises a hydraulic pressure accumulator.

8. The hydraulic power steering system according to claim 1, wherein the hydrostatic driving connection has two sides which are connected with one another by a shut-off valve, said shut-off valve taking up its open position only when energy is supplied to its control element.

9. The hydraulic power steering system according to claim 2, wherein the hydrostatic driving connection has two sides which are connected with one another by a shut-off valve, said shut-off valve taking up its open position only when energy is supplied to its control element.

10. The hydraulic power steering system according to claim 3, wherein the hydrostatic driving connection has two sides which are connected with one another by a shut-off valve, said shut-off valve taking up its open position only when energy is supplied to its control element.

11. The hydraulic power steering system according to claim 5, wherein the hydrostatic driving connection has two sides which are connected with one another by a shut-off valve, said shut-off valve taking up its open position only when energy is supplied to its control element.

12. The hydraulic power steering system according to claim 1, wherein the hydrostatic driving connection comprises two double-acting piston-cylinder units, of which one is forcibly coupled with the steering vehicle wheels and another is forcibly coupled with the manual steering device.

13. The hydraulic power steering system according to claim 1, wherein the hydrostatic driving connection has a hydrostatic pump which is forcibly coupled with the manual steering device.

14. The hydraulic power steering system according to claim 8, wherein the hydrostatic driving connection has a hydrostatic pump which is forcibly coupled with the manual steering device.

15. The hydraulic power steering system according to claim 3, wherein on a delivery side of the two pumps, flap valves are arranged which prevent a flow-back to the respective pump.

16. The hydraulic power steering system according to claim 12, wherein two piston-cylinder units are arranged side-by-side, one of which forms the servo motor and one, as a part of the hydrostatic driving connection, is assigned to the steering vehicle wheels.

17. The hydraulic power steering system according to claim 13, wherein two piston-cylinder units are arranged side-by-side, one of which forms the servo motor and one, as a part of the hydrostatic driving connection, is assigned to the steering vehicle wheels.

18. The hydraulic power steering system according to claim 15, wherein two piston-cylinder units are arranged side-by-side, one of which forms the servo motor and one, as a part of the hydrostatic driving connection, is assigned to the steering vehicle wheels.

19. The hydraulic power steering system according to claim 1, wherein the hydrostatic driving connection has a hydrostatic hydromotor which is assigned to the steering vehicle wheels.

20. The hydraulic power steering system according to claim 1, wherein said desired-value generator is an electronic desired-value generator.

21. The hydraulic power steering system according to claim 1, wherein the manual steering device is a manual steering wheel.

22. The hydraulic power steering system according to claim 1, wherein the servomotor is switched into the free-running condition also by the controllable servo valve arrangement.

* * * * *